(12) United States Patent
Mitra

(10) Patent No.: US 6,421,467 B1
(45) Date of Patent: Jul. 16, 2002

(54) ADAPTIVE VECTOR QUANTIZATION/QUANTIZER

(75) Inventor: Sunanda D. Mitra, Lubbock, TX (US)

(73) Assignee: Texas Tech University, Lubbock, TX (US)

( * ) Notice: Subject to any disclaimer, the term of this patent is extended or adjusted under 35 U.S.C. 154(b) by 0 days.

(21) Appl. No.: 09/406,567

(22) Filed: Sep. 27, 1999

Related U.S. Application Data

(60) Provisional application No. 60/136,418, filed on May 28, 1999.

(51) Int. Cl.[7] ................................................. G06K 9/36
(52) U.S. Cl. ........................................ 382/240; 382/261
(58) Field of Search ................................. 382/240, 241, 382/242, 243, 244, 246, 250, 252, 239, 261, 128, 132, 369; 250/369

(56) References Cited

U.S. PATENT DOCUMENTS

| | | | |
|---|---|---|---|
| 5,745,758 A | 4/1998 | Shaw et al. ................... | 395/672 |
| 5,892,549 A | 4/1999 | Feng ............................ | 348/422 |
| 5,892,847 A | 4/1999 | Johnson ....................... | 382/232 |
| 5,903,673 A | 5/1999 | Wang et al. .................. | 382/236 |
| 6,091,777 A | 7/2000 | Guetz et al. .................. | 375/240 |

Primary Examiner—Andrew W. Johns
Assistant Examiner—Seyed Azarian
(74) Attorney, Agent, or Firm—Perkins, Smith & Cohen, LLP; Jerry Cohen; Jacob N. Erlich

(57) ABSTRACT

An adaptive vector quantization process and quantizer (VQ) using a clustering technique known as AFLC (adaptive fuzzy leader clustering) is disclosed. The quantizer, AFLC-VQ, has been designed to vector quantize wavelet decomposed sub images with optimal bit allocation. The high-resolution sub images at each level have been statistically analyzed to conform to generalized Gaussian probability distributions by selecting the optimal number of filter taps. The adaptive characteristics of AFLC-VQ stem from using self-organizing neural networks with fuzzy membership values of the input samples for upgrading the cluster centroids based on well known optimization criteria. The centroid of each pattern group can represent all the other patterns in that cluster. The entire data set can be indexed into look up tables sent to the user for decoding and viewing the image. By generating look up tables or codebooks and entropy coding of the quantizer output, AFLC-VQ can compress images at 100:1 or greater for transmitting while reconstructing the images with high fidelity.

17 Claims, 8 Drawing Sheets

VQ parameters for Visible Human Image (a_vm1480, 2048x1024, red plane)

| EX | Level 4 (total sample: 512, vector size 4x4) | | | | | | Level 3 (total sample: 2048, vector size 4x4) | | | | | |
|---|---|---|---|---|---|---|---|---|---|---|---|---|
| | V | | H | | D | | V | | H | | D | |
| | $\tau$ | C | $\tau$ | C | $\tau$ | C | $\tau$ | C | $\tau$ | C | $\tau$ | C |
| 1 | 1.0 | 326 | 1.0 | 304 | 1.0 | 242 | 1.7 | 501 | 1.5 | 483 | 1.2 | 499 |
| 2 | 1.0 | 326 | 1.0 | 304 | 1.0 | 242 | 1.7 | 501 | 1.5 | 483 | 1.2 | 499 |
| 3 | 1.6 | 251 | 1.2 | 234 | 1 | 242 | 1.85 | 221 | 1.78 | 216 | 1.45 | 201 |

| EX | Level 2 (total sample: 2048, vector size 8x8) | | | | | | Level 1 (total sample: 8192, vector size 8x8) | | | | | |
|---|---|---|---|---|---|---|---|---|---|---|---|---|
| | V | | H | | D | | V | | H | | D | |
| | $\tau$ | C | $\tau$ | C | $\tau$ | C | $\tau$ | C | $\tau$ | C | $\tau$ | C |
| 1 | 1.9 | 490 | 1.9 | 299 | 1.47 | 469 | 1.75 | 381 | 1.7 | 385 | 1.36 | 456 |
| 2 | N/A | N/A | 1.9 | 299 | N/A | N/A | N/A | N/A | 1.7 | 385 | N/A | N/A |
| 3 | N/A | N/A | N/A | N/A | N/A | N/A | N/A | N/A | N/A | N/A | N/A | N/A |

FIG. 2a

VQ parameters for Visible Human Image (a_vm1480, 2048x1024, green plane)

| EX | Level 4 (total sample: 512, vector size 4x4) | | | | | | Level 3 (total sample: 2048, vector size 4x4) | | | | | |
|---|---|---|---|---|---|---|---|---|---|---|---|---|
| | V | | H | | D | | V | | H | | D | |
| | $\tau$ | C | $\tau$ | C | $\tau$ | C | $\tau$ | C | $\tau$ | C | $\tau$ | C |
| 1 | 1.0 | 339 | 1.0 | 326 | 1.0 | 253 | 1.64 | 479 | 1.68 | 315 | 1.35 | 470 |
| 2 | 1.0 | 339 | 1.0 | 326 | 1.0 | 253 | 1.64 | 479 | 1.68 | 315 | 1.35 | 470 |
| 3 | 1.7 | 240 | 1.25 | 254 | 1.2 | 217 | 2.1 | 235 | 1.7 | 256 | 1.6 | 253 |

| EX | Level 2 (total sample: 2048, vector size 8x8) | | | | | | Level 1 (total sample: 8192, vector size 8x8) | | | | | |
|---|---|---|---|---|---|---|---|---|---|---|---|---|
| | V | | H | | D | | V | | H | | D | |
| | $\tau$ | C | $\tau$ | C | $\tau$ | C | $\tau$ | C | $\tau$ | C | $\tau$ | C |
| 1 | 2.15 | 498 | 2.0 | 345 | 1.6 | 332 | 1.8 | 364 | 2.0 | 286 | 1.4 | 432 |
| 2 | N/A | N/A | 2.0 | 345 | N/A | N/A | N/A | N/A | 1.7 | 385 | N/A | N/A |
| 3 | N/A | N/A | N/A | N/A | N/A | N/A | N/A | N/A | N/A | N/A | N/A | N/A |

FIG. 2b

VQ parameters for Visible Human Image (a_vm1480, 2048x1024, blue plane)

| EX | Level 4 (total sample: 512, vector size 4x4) | | | | | | Level 3 (total sample: 2048, vector size 4x4) | | | | | |
|---|---|---|---|---|---|---|---|---|---|---|---|---|
| | V | | H | | D | | V | | H | | D | |
| | $\tau$ | C | $\tau$ | C | $\tau$ | C | $\tau$ | C | $\tau$ | C | $\tau$ | C |
| 1 | 1.0 | 306 | 1.0 | 288 | 1.0 | 208 | 1.55 | 475 | 1.45 | 499 | 1.2 | 458 |
| 2 | 1.0 | 306 | 1.0 | 288 | 1.0 | 208 | 1.55 | 475 | 1.45 | 499 | 1.2 | 458 |
| 3 | 1.4 | 244 | 1.15 | 245 | 1.0 | 208 | 2.0 | 245 | 1.9 | 92 | 1.45 | 218 |

| EX | Level 2 (total sample: 2048, vector size 8x8) | | | | | | Level 1 (total sample: 8192, vector size 8x8) | | | | | |
|---|---|---|---|---|---|---|---|---|---|---|---|---|
| | V | | H | | D | | V | | H | | D | |
| | $\tau$ | C | $\tau$ | C | $\tau$ | C | $\tau$ | C | $\tau$ | C | $\tau$ | C |
| 1 | 1.93 | 493 | 1.90 | 435 | 1.53 | 509 | 1.8 | 499 | 1.8 | 456 | 1.7 | 75 |
| 2 | N/A | N/A | 1.90 | 435 | N/A | N/A | N/A | N/A | 1.8 | 456 | N/A | N/A |
| 3 | N/A | N/A | N/A | N/A | N/A | N/A | N/A | N/A | N/A | N/A | N/A | N/A |

FIG. 2c

Comparison between AFLC-VQ, JPEG and EZW (Cervical Spine Image)

| Compression scheme | CR | MSE | PSNR |
|---|---|---|---|
| AFLC-VQ (without entropy coding) | 32.51 | 17.48 | 35.71 |
| | 78.77 | 77.10 | 29.26 |
| | 113.78 | 92.06 | 28.49 |
| JPEG (with entropy coding) | 32 | 5.35 | 40.85 |
| | 78 | 18.18 | 35.54 |
| | 99 | 152.27 | 26.30 |
| EZW (without arithmetic coding) | 32 | 37.96 | 32.34 |
| | 78 | 134.25 | 26.85 |
| | 113 | 204.04 | 25.03 |
| EZW (with arithmetic coding) | 32 | 13.07 | 36.97 |
| | 78 | 49.11 | 31.21 |
| | 113 | 58.76 | 30.44 |

FIG. 5a

Comparison between AFLC-VQ, JPEG and EZW (Visible Human Image)

| Compression scheme | CR | MSE | PSNR |
|---|---|---|---|
| AFLC-VQ (without entropy coding) | 42.56 | 23.65 | 34.39 |
| | 74.14 | 31.00 | 33.22 |
| | 132.13 | 49.71 | 31.17 |
| JPEG (with entropy coding) | 42 | 14.36 | 36.56 |
| | 74 | 25.92 | 33.99 |
| | 99 | 342.09 | 22.79 |
| EZW (without arithmetic coding) | 42 | 45.46 | 31.55 |
| | 74 | 87.94 | 28.69 |
| | 132 | 160.76 | 26.07 |
| EZW (with arithmetic coding) | 42 | 21.32 | 34.84 |
| | 74 | 30.19 | 33.33 |
| | 132 | 45.19 | 31.58 |

FIG. 5b

Histogram comparsion between AFLC-VQ, EZW and JPEG (Cervical Spine)

ADAPTIVE VECTOR QUANTIZATION/QUANTIZER

CROSS-REFERENCE TO RELATED APPLICATION

Priority is claimed under 35 U.S.C. §119 (e) on the Provisional Application, Serial No. 60/136,418, filed on May 28, 1999, of common title, of common inventorship and assignment with the present application.

FIELD OF THE INVENTION

The present invention relates generally to data compression, transmission and high fidelity reconstruction of such data, especially image data. Although other information types may benefit from the present invention, it applies with special interest to complex images such as medical and satellite images.

BACKGROUND OF THE INVENTION

Large volumes of medical imagery demand high fidelity image compression for archiving and transmission. Lossy compression of medical images, however, has always been a subject of controversy since the loss of information involved is thought to affect diagnostic judgment. Most radiologists prefer not to exceed a compression ratio of 10:1 when JPEG compression is used. *Application of Wavelet Compression to digitized Radiographs*, by M. A. Goldberg, et al., Vol. 163, pp463–468, AJR(1994) describes wavelet based compression techniques which may not reduce the image quality even when subjected to compression ratio up to 30:1. Wavelet coding is a class of sub-band coding that allows selective coding of sub-bands significant to visual perception. The encoding process actually determines the distortion introduced by quantization. It is well known from rate distortion theory that vector quantization yields optimal distortion. Implementation of vector quantization, specifically the encoding process, is, however, quite involved. However, the decoding process in vector quantization is relatively simple and can be achieved from look up tables. Vector quantization of standard images is a well-researched topic. See special Issue on Vector Quantization, IEEE Trans. Image Process (1996). Other prior art approaches, in general, use a simple statistical clustering technique for generating the code vectors in vector quantization. Limitations of these earlier algorithms include long search processes and getting trapped in local minima. Yet other research discloses clustering techniques for efficient codebook design, including fuzzy clustering in deterministic annealing associated with the materials sciences.

Multi-resolution codebook design, as known in the art, provides a database of the centroid vectors or code vectors of differing resolutions. These centroid vectors as discussed herein are used to reconstruct the entire set of vectors in a given cluster within a given optimization criteria. The codebook is indexed in some ordinary fashion as known in the art. When a specific code vector is to be sent, the index into the codebook is sent instead. The receiver indexes into the same codebook and retrieves the code vector being sent. In this way the data being sent is compressed.

However, it would be desirable to provide a system that provides for image data compression and storage and/or transmission of that compressed data and subsequent high fidelity reconstruction of the image.

It is an object of the present invention to compress data by combining vector quantization and adaptive fuzzy leader clustering of the data, subsequent transmission or storage of that compressed data, followed by reconstruction of the original data.

It is another object of the present invention to provide a process for fast high fidelity transmission of images.

SUMMARY OF THE INVENTION

The above objects are satisfied and other limitations of the prior art are overcome in the present invention. The present invention includes in combination an Adaptive Fuzzy Leader Clustering or AFLC for on-line generation of code vectors, and applying AFLC to quantization of wavelet transformed sub images. The present invention may also be referred to with the acronym AFLC-VQ. The selection of the number of clusters generated is decided by the quantization level to be applied i.e. whether coarse or fine quantization is needed. AFLC-VQ is based on an integration of self-organizing neural networks with fuzzy membership values of data samples for upgrading the centroid values of the clusters as the samples are presented thus eliminating most misclassifications. This technique is also noise tolerant and avoids many problems associated with earlier vector quantization efforts particularly for large medical images. The improved performance of this new technique is its capability to generate high fidelity reconstructed images even at very low bit rate in the compressed image with acceptable MSE (mean square error) and PSNR (peak signal to noise ratio).

Vector quantization algorithms provide advantages for high fidelity transmission of medical images at very low bit rates in a fast, progressive manner for applications in telemedicine and other interactive web based downloading of large medical images in monochrome and color. In a preferred embodiment, the addition of an adaptive arithmetic coder further improves the performance of the application of the AFLC-VQ algorithm. An advantage of being able to use such low bit rate, i.e. a high compression ratio without introducing significant distortion in the reconstructed image, is that under medical emergency conditions the compressed image can be sent to a remote location quickly (since there are few bits) over the internet for immediate evaluation while images with better quality can follow in a progressive manner if desired.

A paper relevant to the present invention, authored by the present inventor, Sunanda D. Mitra, along with Shuyu Yang (who is not an inventor of the present invention), entitled High Fidelity Adaptive Vector Quantization at very low bit rates for Progressive Transmission of Radiographic Images, was published in Journal of Electronic Imaging, Jan. 1999, Vol. 8(1)/1. This paper is hereby incorporated herein by reference.

For a better understanding of the present invention, together with other and further objects thereof, reference is made to the accompanying drawings and detailed description and its scope will be pointed out in the appended claims.

BRIEF DESCRIPTION OF THE DRAWINGS

FIG. 2a contains Tables 1(1) of vector quantization for a visible human image in red;

FIG. 2b contains Tables 1(2) of vector quantization for a visible human image in green;

FIG. 2c contains Tables 1(3) of vector quantization for a visible human image in blue;

FIG. 5*a* and 5*b* are two Tables 3(*a*) and 3(*b*) comparing AFLC-VQ, JPEG and EZW for different compression rates (CR), means square error (MSE), and peak signal to noise ratios )PSNR);

DESCRIPTION OF PREFERRED EMBODIMENTS

Figure 1:
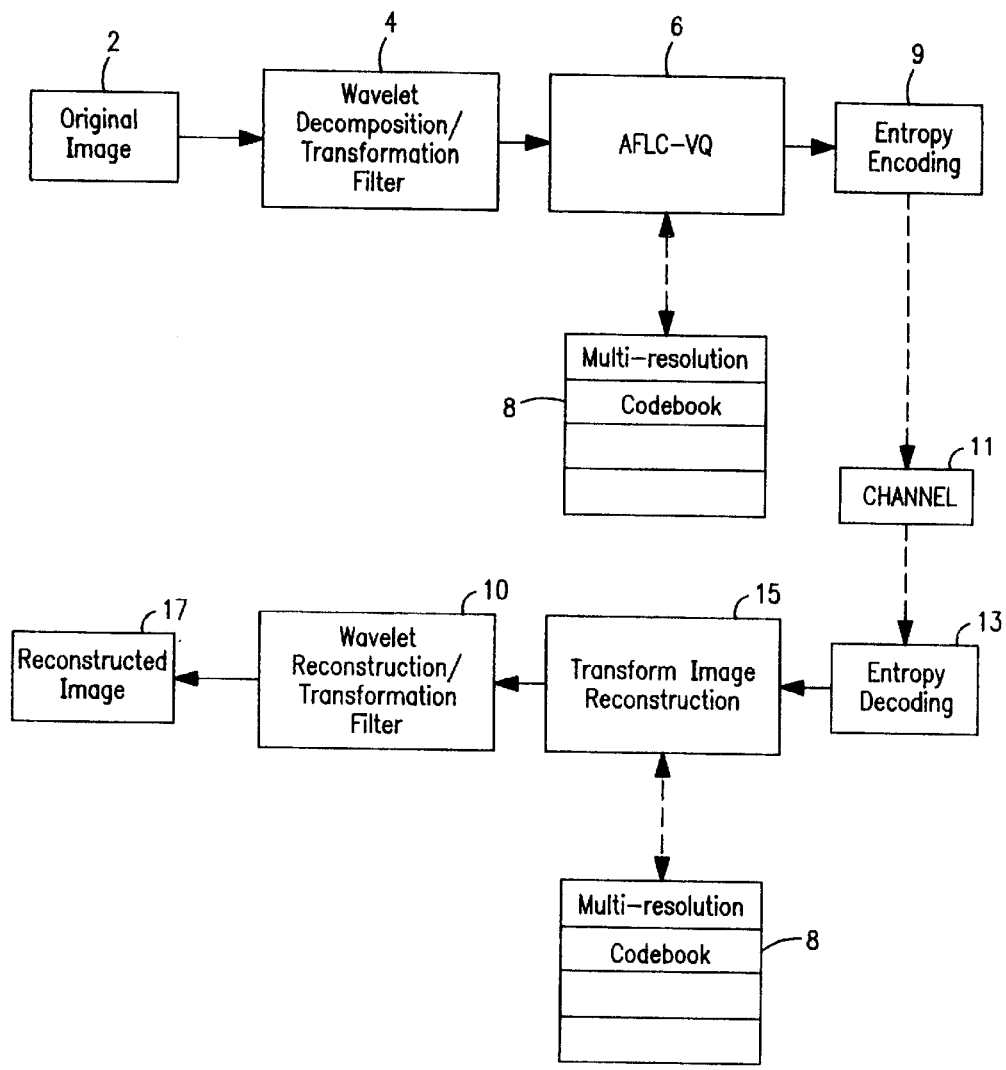
FIG. 1 is a schematic block diagram of the inventive Vector Quantizer.

FIG. 1 illustrates the general principle of wavelet based vector quantization for encoding an image. The original input image 2 is decomposed (wavelet decomposition/ transformation filter) 4 into four levels. Each high resolution image at each level is then vector quantized by AFLC-VQ 6 to generate a multiresolution codebook 8. As discussed below, the codebook is indexed and an index file representing the decomposed/transformed sub-image data is formed. The indexed codebook is sent and stored at the receiver. When data is being sent, the actual data being sent is the index into the codebook for the sub-images. This index data is entropy encoded 9 for sending via a communications channel 11 to a receiver. The received index data is entropy decoded 13 and the transformed sub-images are reconstructed .15 by looking up the received indexes from the codebook 8 at the receiver. The image is reconstructed 10 ready for presentation 17.

The filter in items 4 and 10 of FIG. 1, includes a length of wavelet transformation 4 (and related 10) matrix which plays an important role on the accuracy of the encoding scheme. Based on the distribution characteristics of the wavelet coefficients, appropriate filter lengths for specific wavelets are chosen prior to encoding.

The wavelet transformation of a signal provides a compact representation of the signal in the space/time frequency plane. In practice, the finite multiresolution wavelet representation of a signal can be expressed as a sum of superpositions of two properly chosen orthonormal basis functions known as the wavelets and the scaling functions.

The multiresolution discrete wavelet decomposition of any arbitrary function f(x) in terms of two properly chosen sets of orthonormal basis functions $\psi(x)$ and $\phi(x)$ is expressed as $$f(x) = \sum_{n=-\infty}^{\infty} c_{L,n} a_0^{-L/2} \phi\left(\frac{x}{a_0^L} - nb_0\right) + \sum_{m=1}^{L} \sum_{n=-\infty}^{\infty} d_{m,n} a_0^{-m/2} \psi\left(\frac{x}{a_0^m} - nb_0\right) \quad (1)$$

where the scaling coefficient is the inner product $$c_{L,n} = \langle f(x), \phi_{L,n}(x) \rangle = \frac{1}{a_0^{L/2}} \int f(x) \phi(a_0^{-L} x - nb_0) dx \quad (2)$$

and where $\psi(x)$ and $\phi(x) \epsilon Z^2$ are known as the mother wavelets and the scaling functions respectively. It can be shown that the detail or information lost in representing a function f(x) in a lower resolution by taking an inner product of f(x) with the scaling function $\phi(x)$ is the projection of the original function f(x) in the $\phi(x)$ sub-space. The expansion coefficients are computed from orthonormality and vanishing moments criteria to ensure exact reconstruction. The details of multiresolution wavelet reconstruction can be found in well known references. Such multi-resolution decomposition can be extended to 2-D signals and used for image compactness and decorrelation prior to scalar or vector quantization. In 2-D multi-resolution discrete wavelet decomposition, the 2-D scaling function $\phi(x,y)$ is assumed to be separable, i.e., $\phi(x,y) = \phi(x)\phi(y)$. If $\psi(x)$ and $\psi(y)$ are companion wavelets to scaling functions $\phi(x)$ and $\phi(y)$, then the three basic 2-D wavelets are:

$\psi_1 = \phi(x)\psi(y)$, $\psi_2 = \psi(x)\phi(y)$, and $\psi_3 = \psi(x)\psi(y)$.

Therefore, 2-D discrete wavelet decomposition at each level yields horizontal, vertical, and diagonal edge information corresponding to the three basic 2-D wavelets. The multiresolution wavelet decomposition of an image, based on the above discussion, is a type of sub-band analysis system, which results in a pyramidal structure consisting of a low level smooth image and several error images belonging to different resolutions.

Since a coder performance at any level of decomposition and orientation can be predicted from the statistics of the sub-image and such pdf (probability distribution function) has been reported to be approximately represented by a generalized Gaussian for specific wavelets and filter lengths, Three classes of wavelets were analyzed and the filter lengths varied from 6 to 20 coefficients. The goal was to find the pdf of subimages which would best fit a generalized Gaussian of the following form for a specific class of images, namely the Visible Human color images:

$$P_{m,d}(x) = a_{m,d} \exp(-|b_{m,d} x|^{r_{m,d}}) \quad (3)$$

with $$a_{m,d} = \frac{b_{m,d} r_{m,d}}{2\Gamma\left(\frac{1}{r_{m,d}}\right)} \text{ and } b_{m,d} = \frac{1}{\sigma_{m,d}} \frac{\Gamma\left(\frac{3}{r_{m,d}}\right)^{\frac{1}{2}}}{\Gamma\left(\frac{1}{r_{m,d}}\right)^{\frac{1}{2}}}$$

where $\Gamma$ is the standard Gamma function.

Experimental results indicate that the pdf's of the wavelet coefficients of sub-images of typical Visible Human images are represented by a generalized Gaussian function with the value of the parameter r around 0.7. However the difference in variances between the experimental and the theoretical pdf's are minimized by choosing appropriate filter lengths and a specific wavelet family for specific classes of images.

With the use of Daub12 (a process well known in the art) for wavelet decomposition, the number of clusters resulted from AFLC vary more smoothly and show more controllability of compression ratio.

Preferred embodiments of the present invention are best understood by describing the major component parts, Vector Quantization (VC) and Adaptive Fuzzy Leader Clustering (AFLC) separately.

Vector Quantization:

A vector quantizer Q is a mapping from a vector in k-dimensional Euclidean space, $R^k$, into a finite set W containing M reproduction vectors, referred to as code vectors or codewords:

Q: $R^k \to W$,

Where $W = \{w_i, i=1, 2 \ldots M\}$ is the set of reproduction vectors.

Vector quantization can be described as the process of grouping similar vectors into the same cluster so that the centroid vector of each cluster is able to reconstruct the entire set of vectors in that cluster with a minimum distortion dictated by the similarity and optimization criteria employed. Therefore the centroid vectors or the code vectors form the codebook that consists of the addresses of all code vectors thus reducing the file size of the original data set tremendously while introducing minimal distortion. The distortion introduced depends on the complexity of the similarity criterion, optimization criterion, and the level of quantization used. In most vector quantization techniques, Euclidean distance measure is used as a similarity measure. An integrated neural-fuzzy clustering technique is used, with a modified ART (Adaptive Resonance Theory) type neural networks that initially clusters the vectors into similar groups, and then the cluster centroids are updated by an optimization constraint including fuzzy membership values of the data samples following the use of the fuzzy C means (FCM) nonlinear equations. A modification of this algorithm may be used that includes a new similarity measure enabling formation of clusters of any shape and a Kohonen type upgrading rule for the centroids. These modifications allow better allocation of the vectors to the proper clusters by introducing an intra-cluster membership function while upgrading the centroids. It also eliminates some of the problems with ART-type networks due to normalization of the sample vectors. Although the achievability of minimum distortion at a specific bit rate by vector quantization has been theoretically proven from rate distortion theory almost half a century ago, practical implementation of VQ for small sizes and classes of images has been achieved relatively recently. Many of the earlier algorithms using simple statistical clustering suffer from a number of problems namely lack of convergence, getting trapped in local minima, and inability to handle large data sets. More advanced vector quantization algorithms have eliminated some of the above problems. However, vector quantization of large data sets as encountered in many medical images still remains a challenging problem.

The present invention provides an adaptive vector quantization technique that is capable of encoding large size as well as color images with minimum distortion in the decoded images even at a compression ratio (CR) above 100:1. The success of this new technique depends on an adaptive clustering technique with efficient optimization criteria in combination with multiresolution wavelet decomposition.

For each image class, a suitable vigilance parameter, $\tau$, needs to be selected for a range of clusters that could be formed to generate multi resolution codebooks for wavelet decomposed sub images. Once the parameter $\tau$ is established, the optimization process involves updating of the cluster centroids, initially formed by the modified self organizing neural network architecture, by using the well known FCM equations.

In non-fuzzy "hard" clustering, the boundaries of different clusters are such that one pattern is assigned to exactly one cluster. On the contrary, fuzzy clustering provides partitioning resulting from additional information supplied by the cluster membership values indicating different degrees of belongingness.

Consider a finite set of elements $X=\{x_1, x_2, \ldots, x_n\}$ as being elements of the p-dimensional Euclidean space $R^p$. The problem is to perform a partition of this collection of elements into c fuzzy sets with respect to a given criterion, where c is a given number of clusters. Usually, the criterion is to optimize an objective function that acts as a performance index of clustering. The end result of fuzzy clustering can be expressed by a partition matrix U such that $U = [\mu_{ij}]_{i=1 \ldots c, j=1, \ldots n}$, where $\mu_{ij}$ is a numerical value in and expresses the degree to which the element $x_j$ belongs to the ith cluster. A widely used clustering method is the fuzzy c-means (FCM) algorithm developed by Bezdek. The objective function of the FCM algorithm takes the form of $$J(\mu_{ij}, v_k) = \sum_{i=1}^{c} \sum_{j=1}^{n} \mu_{ij}^m \|x_j - v_k\|^2, m > 1 \quad (4)$$

where m is called the exponential weight, which influences the degree of fuzziness of the membership (partition) matrix. To solve this minimization problem, the objective function in equation [4] is first differentiated with respect to $v_i$ (for fixed $\mu_{ij}$, i=1, . . . , c, j 1, . . . , n) and then to $\mu_{ij}$ (for fixed $v_i$, i=1, . . . , c). After applying the condition $\sum_{i=1}^{c} \mu_{ij}=1$, $\forall j=1,2, \ldots n$, equation [4] gives $$v_i = \frac{1}{\sum_{j=1}^{n} (\mu_{ij})^m} \sum_{j=1}^{n} (\mu_{ij})^m x_j, \quad i = 1, 2, \ldots, c \quad (5)$$

$$\mu_{ij} = \frac{(1/\|x_j - v_i\|^2)^{1/m-1}}{\sum_{k=1}^{c} (1/\|x_j - v_k\|^2)^{1/m-1}}, \quad i = 1, 2, \ldots, c; j = 1, 2, \ldots, n. \quad (6)$$

The system described by equation (5) and equation (6) cannot be solved analytically. However, the FCM algorithm provides an iterative approach to approximating the minimum of the objective function starting from a given position.

Neural networks draw their inspiration from the function of the brain and model the brain at the level of neurons. Motivation for using neural models for performing intelligent tasks stems from the fact that humans exhibit remarkable ability to cope with unexpected situations and to learn without the help of any teacher. Perhaps this explains why learning and classification are the central issues of neural network research. Here, the concepts of two self-organizing neural networks which perform clustering by different approaches are presented. The ideas embedded in these neural networks have been integrated with fuzzy membership concepts to develop the AFLC and IAFC clustering algorithms.

Kohonen Clustering Network (KCN), known in the art, is an unsupervised scheme, which finds the "best" set of weights for hard clustering in an iterative, sequential manner. The structure of KCN consists of two layers: an input (fan-out) layer and an output (competitive) layer. Given an input vector, the neurons in the output layer compete among themselves and the winner (whose weight vector has the minimum distance from the input vector) updates its weight and those of some set of predefined neighbors using equation (7), below. The process is continued until the weight vectors "stabilize." In this method, a learning rate must be defined which decreases with time in order to force termination. The update neighborhood that is also reduced with time must be defined by $$w_{ij}(k+1) = \begin{cases} w_{ij}(k) + \alpha(k)[x_j(k) - w_{ij}(k)], & \text{for } i \in N_i(k), \text{ otherwise,} \\ w_{ij}(k) & \end{cases} \quad (7)$$

for all i and j, where $N_i(k)$ is the neighborhood set of the winner node, and $\alpha(k)$ is the learning rate.

A competitive learning model does not always learn a stable code in response to arbitrary input patterns and problems arise especially if too many input patterns are presented to the network or if the input patterns form too many clusters. The reason is that, as new input patterns arrive, old patterns are washed away due to the plasticity or instability of competitive learning model. Grossberg's Adaptive Resonance Theory (ART), known in the art, addresses exactly this plasticity-stability problem and forms the basis of ART-1, ART-2 and ART-3.

The ART-1 architecture has two layers of neurons called the comparison layer (F1) and the recognition layer (F2). The classification decision is indicated by a single neuron activated in the recognition layer. The neurons in the comparison layer respond to input features in the pattern (in ART-1, inputs are binary valued). The weights between these two layers are modifiable in both directions according to two different learning rules. The recognition layer neurons have inhibitory connections that allow for a competition. The network architecture can be separated into two parts: the attention and the orienting systems. The attention system has two layers of neurons (comparison and recognition) with feed-forward and feedback characteristics. This system determines whether the input pattern matches one of the prototypes stored. If a match occurs, resonance is established. The orienting subsystem is responsible for sensing mismatch between the bottom-up and top-down patterns on the recognition layer. The recognition layer response to an input vector is compared to the original input vector through a mechanism termed vigilance. Vigilance provides a measure of the distance between the input vector and the cluster center corresponding to the activated neuron in the recognition layer. When vigilance falls bellow a preset threshold, a new category must be created and the input vector must be stored into that category. That is, a previously unallocated neuron within the recognition layer is allocated to a new cluster category associated with the new input pattern.

The recognition layer follows the winner-take-all paradigm (also known as MAXNET). If the input vector passes the vigilance, the winning neuron (the one most like the input vector) is trained such that its associated cluster center in feature space is moved toward the input vector.

Neuro-Fuzzy algorithms retain the basic properties and architectures of neural networks and simply "fuzzify" some of their elements. In these classes of networks, a crisp neuron can become fuzzy and the response of the neuron to its activation layer signal can be of a fuzzy relation type rather than a continuous or crisp function type. Examples of this approach can be found where domain knowledge becomes formalized in terms of fuzzy sets and afterward can be applied to enhance the learning algorithms of the neural networks or augment their interpretation capabilities. Since the neural architecture is conserved, changes are made in the weights connecting the lower layer to the upper layer neurons.

AFLC is a hybrid neuro-fuzzy system that can be used to learn cluster structure embedded in complex data sets, in a self-organizing, stable manner. A choice of the Euclidean metric is made in developing the AFLC system while keeping a simple control structure adapted from ART-1. The AFLC algorithm initially starts with the number of clusters set to zero. The system is initialized with the input of the first feature vector $X_j$. As is to leader clustering, this first input is said to be the prototype of the first cluster. The next normalized input feature vector is then applied to the bottom-up weights in a simple competitive learning scheme, or dot product. The node that receives the largest input activation $Y_i$ is chosen as the prototype vector. As in the original ART-1:

$$Y_i = \max_j \sum_{k=1}^{p} X_{jk} b_{ki}, \ 1 \leq j \leq N \tag{8}$$

After a node is selected as a winner, the comparison between the cluster prototype associated with $Y_i$ (the centroid $v_i$) and the current input vector $X_j$ is performed as follows:

$$R = \frac{\|X_j - v_i\|}{\frac{1}{N_i}\sum_{k=1}^{N_i} \|X_k - v_i\|} < \tau \tag{9}$$

where $N_i$ is the number of samples in class i. If the ratio R is less than a user-specified threshold $\tau$, then the input belongs to the cluster originally activated by the simple competition. The choice of the value of $\tau$ is determined empirically after a number of initial runs.

When the input is classified as belonging to an existing cluster, it is necessary to update the prototype (centroid) and the bottom-up weights associated with that cluster. First, the degree of membership, $\mu_{ij}$, of $X_j$ to the winning cluster, $v_i$, is calculated using equation. If the fuzzy membership value of the input pattern is less than a threshold $\sigma$, AFLC resets the winning node and activates a procedure to find a new winning node whose centroid is closest to the input pattern. If the fuzzy membership value of the input pattern is greater than $\sigma$, the new cluster centroid for the winning node Yi is updated by equation where parameter n changes to $N_i$ (the number of samples in cluster i). The AFLC model was later modified to develop the IAFC model to eliminate some of the inherent problems in the ART-type algorithms. A brief description of the IAFC model is provided below.

An IAFC model, known in the art, introduces a similarity measure for the vigilance criterion incorporating a fuzzy membership value to Euclidean distance as follows:

$$R = e^{-\gamma \mu_i} \|X - v_i\| \tag{10}$$

where $\mu_i$ is the fuzzy membership value of the input data pattern in the ith winning cluster, and $\gamma$ is a multiplicative factor that controls the shape of the clusters. Such an incorporation considers not only the Euclidean distance between the input pattern and the centroid of a winner but also the relative proximity of the input pattern to the currently existing cluster centroids as the degree of similarity. This similarity measure can cause the cluster centroids to drift around preventing weights from converging quickly. The incorporation of an intra-cluster membership value and a function of the number of iterations into a Kohonen-type learning rule eliminate this problem.

IAFC finds a winning cluster by performing the dot product (similar to ART and AFLC) between the normalized input vector I and the bottom-up weights $b_i$. The neuron that receives the largest input activation $Y_i$ wins the competition. After selecting a winning cluster, the IAFC algorithm performs the vigilance test according to the vigilance criterion between the unnormalized input vector X and the winning node. If the winning cluster satisfies the vigilance test (R<$\tau$), the centroid is updated using the following equation:

$$v_i^{(new)} = (1 - \lambda_{fuzzy}) v_i^{(old)} + \lambda_{fuzzy} X \tag{11}$$

where, $$\lambda_{fuzzy} = \frac{1}{k(l-1)+1} \pi(X; v_i^{(old)}, \tau)\mu_i^2 \quad (12)$$

and $$\pi(X; v_i^{(old)}, \tau) = \quad (13)$$

$$\begin{cases} 1 - 2(\|X - v_i^{(old)}\|/\tau)^2, & \text{when } 0 \le \|X - v_i^{(old)}\| \le \tau/2 \\ 2(1 - \|X - v_i^{(old)}\|/\tau)^2, & \text{when } \tau/2 \le \|X - v_i^{(old)}\| \le \tau \\ 0, & \text{when } \|X - v_i^{(old)}\| \ge \tau \end{cases}$$

The π-function decides the intra-cluster membership value of the input data pattern in the ith-winning cluster, where 1 is the number of iterations and k is a given constant.

The IAFC algorithm initially starts with the number of clusters set to zero. When the first input pattern is presented, it becomes the first cluster centroid. For the next input pattern, the membership value will obviously be one since only one cluster is present. In this case, the vigilance criterion used is just $\|X-v_i\|<\tau$, as the fuzzy membership value has no physical meaning. If it satisfies the vigilance test, the centroid is updated by the statistical average between two points. After more than one cluster are formed, the IAFC algorithm uses the fuzzy membership value for the vigilance test and the intra-cluster membership value for updating the centroid of a winning cluster. While determining a winning cluster, the winner is decided by the direction between the input data and the centroid of clusters. This procedure can cause misclassifications because a cluster for which the centroid has the smallest difference of angle wins the competition even though it is located farther from the input data than other cluster centroids. To avoid misclassifications, the IAFC algorithm calculates the membership value after selecting the winning cluster. If the fuzzy membership value is less than a threshold σ, decided by the user, the IAFC algorithm activates the procedure to find the cluster that is closest to the input pattern. The closest cluster becomes the new winner.

Suitable criteria, also called performance criteria, are needed to rigorously evaluate the performance of a compression scheme. In case of images, the search for simple and suitable criteria is hindered by the fact that the results obtained by statistical performance criteria may not agree with the subjective evaluation of the human eye. Since the objective is data compression, the compression ratio at optimal distortion is obviously an important performance measure. The reconstructed image quality can be evaluated using the mean-squared error (MSE), the normalized mean-squared error (NMSE) and peak signal-to-noise ratio (PSNR) as error metrics. These error metrics do not always correlate well with perceived image quality, although they provide statistical measures of relative quality. Denoting the original N×N image gray level matrix by f and the corresponding reconstructed image matrix by f̄, MSE and NMSE are given by:

$$MSE = \frac{1}{N^2} \sum_{i=0}^{N-1} \sum_{j=0}^{N-1} [f(i,j) - \bar{f}(i,j)]^2, \text{ and} \quad (14)$$

$$NMSE = \frac{1}{N^2} \sum_{i=0}^{N-1} \sum_{j=0}^{N-1} \frac{[f(i,j) - \bar{f}(i,j)]^2}{f_{\max}^2}. \quad (15)$$

The related measure of PSNR (in dB) is computed using $$PSNR = 10 \log_{10} \frac{-1}{NMSE} \sqrt{\quad} \quad (16)$$

The bit per pixel (bpp) value and compression ratio (CR) are calculated as follows.

$$bpp = \frac{\text{Number of bits required to represent the image}}{\text{Number of pixels in the image}}, \quad (17)$$

and $$CR = \frac{\text{Total Number of bits of original image}}{\text{Total Number of bits of compressed image}} \quad (18)$$
$$= \frac{bpp \text{ of original image}}{bpp \text{ of compressed image}}$$

Experimental Examples:

The wavelet transform of an image decomposes the image into different subimages containing different information. Subimages in higher levels of decomposition contain more information while lower level subimages contain more detail of the image. Experimental results demonstrate that, when an image is decomposed into 4 levels, subimages on the $1^{st}$ level and $2^{nd}$ level can be selectively discarded or coarsely quantized without severely deteriorating the visual effect of the reconstructed image.

Codebook size resulting from AFLC-VQ depends mainly on the user-specified vigilance test parameter τ (tao, the symbol and the word are used interchangeably herein), which has a direct control of the number of clusters (C) resulting from the algorithm. FIG. 2 in Tables 1(1), 1(2), and 1(3) give the τ-C results derived from a 2048×1024 Visible Human Image a_vm1480 and FIG. 3, Table 2 show the τ-C results from a a typical 512×512 image for the Cervical Spine from original graphical Visible Human images.

Figures 3, 4A:
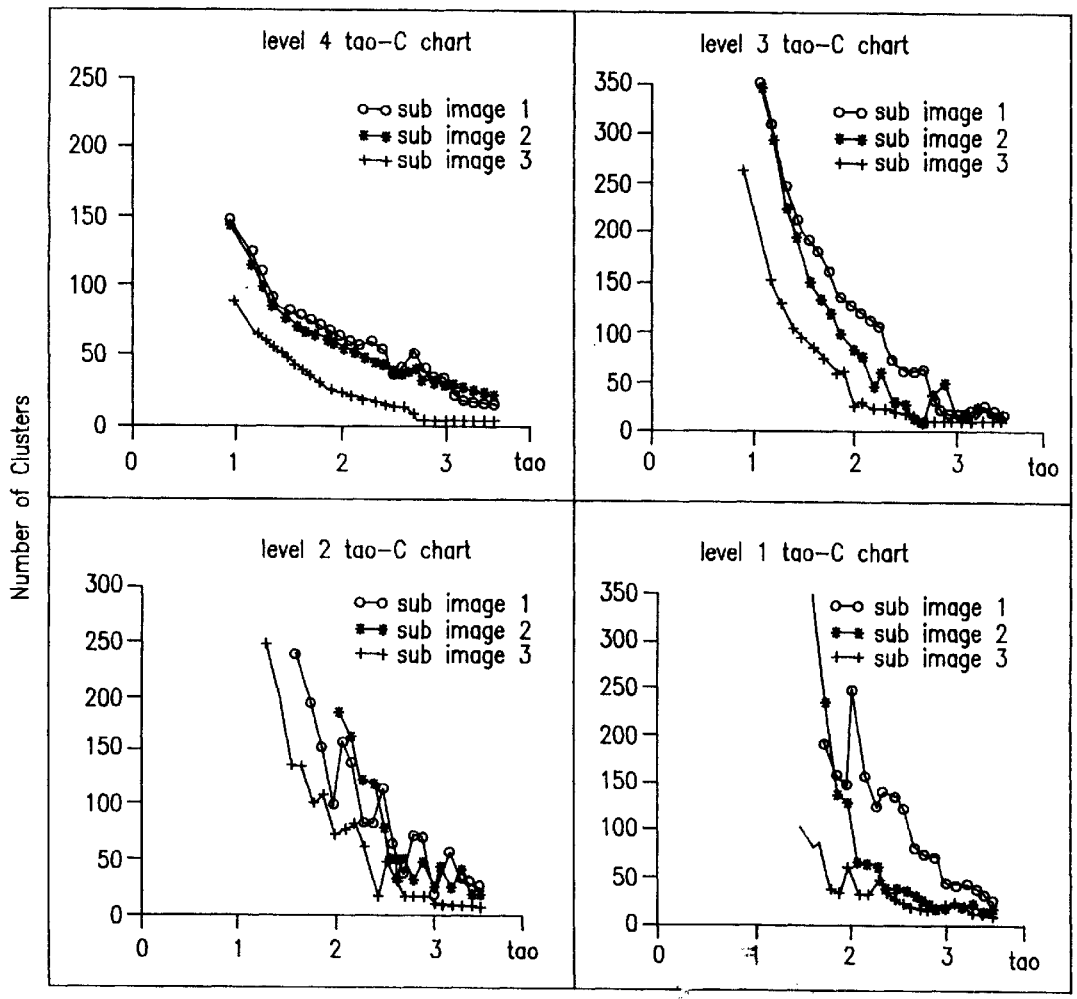
FIG. 3 is Table 2 of vector quantization for a human cervical image.
FIGS. 4*a* and 4*b* are histogram associated with Table 1 and Table 2.

As can be seen from the Tables of FIGS. 2 and 3, lower resolution subimages can be quantized in a smoother continuous manner than the higher level subimages. For low compression ratio, both the lower level and higher level subimages are quantized finely by specifying a small value of τ so as to preserve as much image information as possible. On the other hand, for high compression ratio, high-resolution subimages can be selectively discarded or roughly quantized by providing a large τ value combining together with an appropriately quantized lower resolution subimages. Graphs showing the tao-C of the tables in FIG. 2 and FIG. 3 are shown in FIG. 3b and 3c.

Figure 4B:
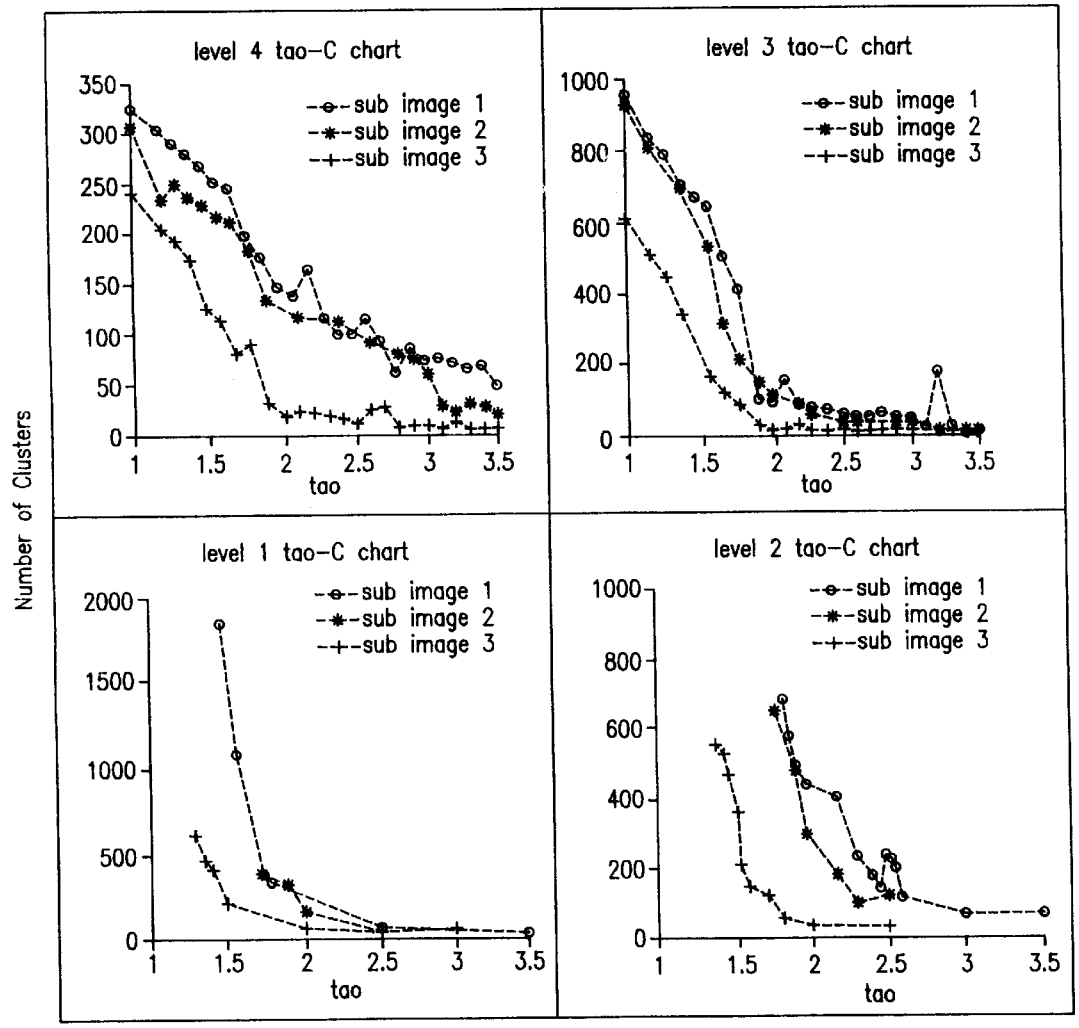
Figure 6A:
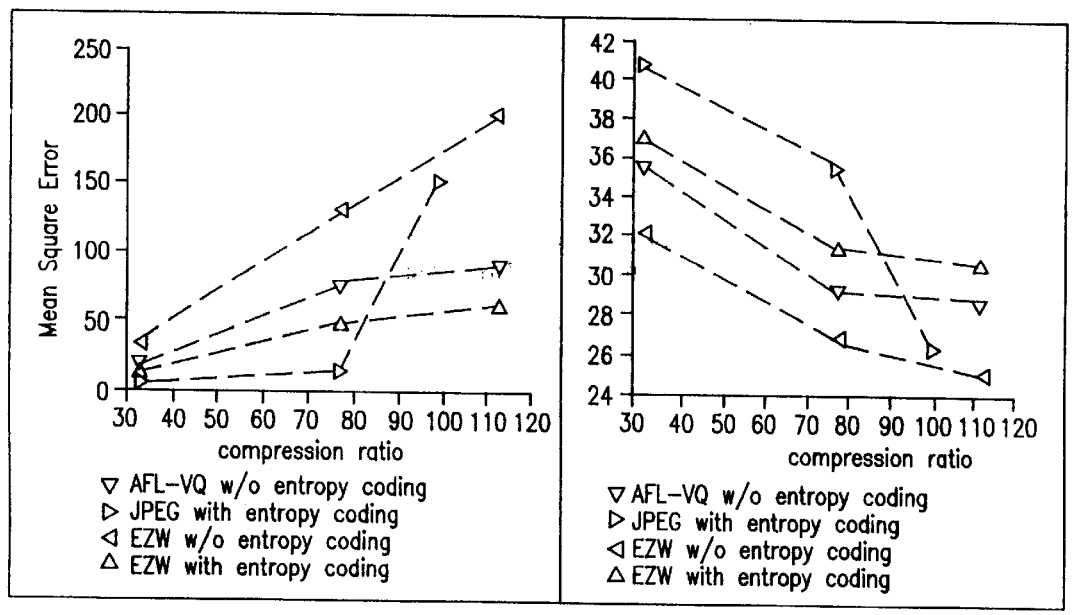
FIGS. 6(*a*) and 6(*b*) are graphs of algorithm performance.
Figure 6B:
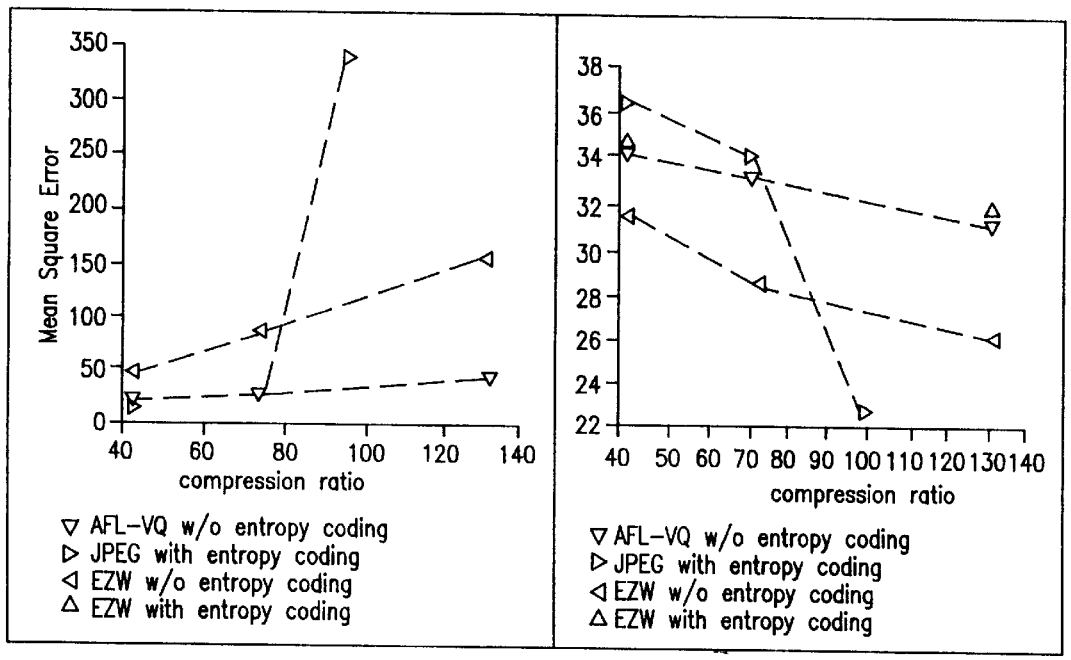
Figure 7:
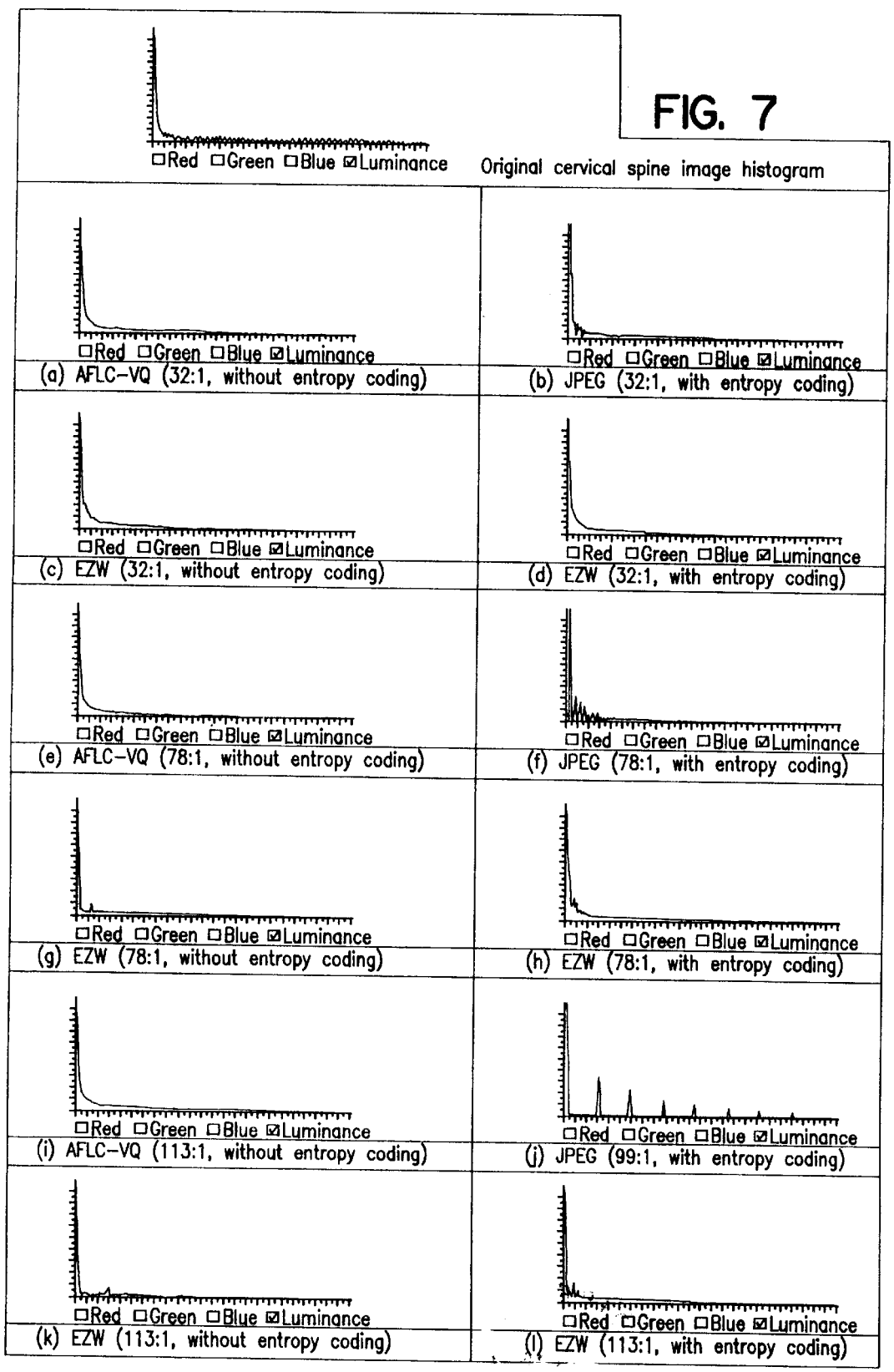
FIG. 7 has histogram comparisons of cervical spine image reconstruction.
Figure 8:
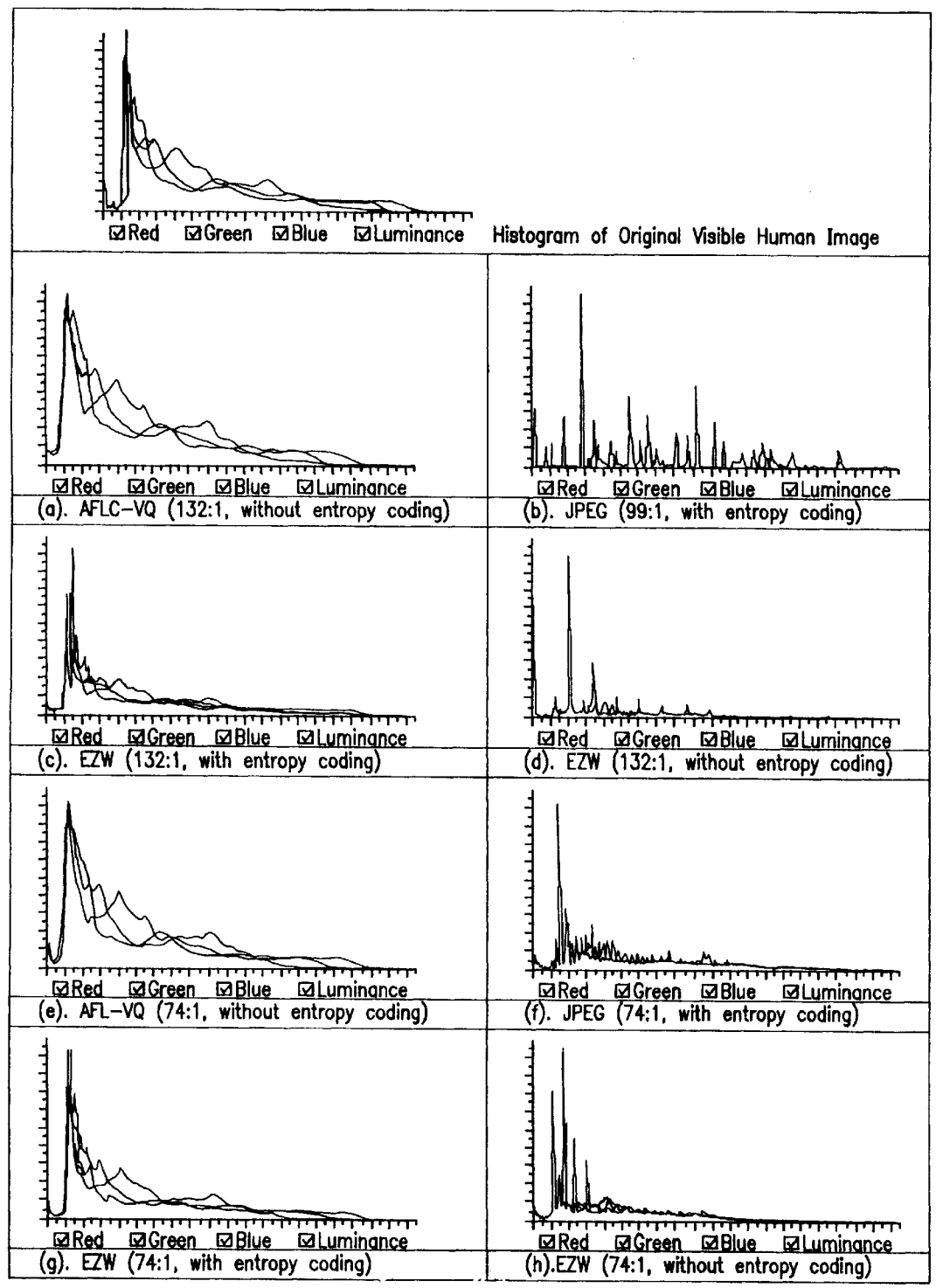
FIG. 8 has histogram comparisons of three color human image reconstruction.

Results according to the inventive compression scheme are presented in FIG. 4 in Tables 3(a) and 3(b). These results show that AFLC-VQ compressed and reconstructed images show better MSE and PSNR than JPEG for the highest compression ratio used. It is noteworthy, however, that the compression ratio computed for the AFLC algorithm does not include entropy coding of the code book at this stage. When AFLC-VQ results are compared with the results of EZW without entropy coding, the performance of AFLC-VQ is much better than EZW in terms of MSE (mean square error) and PSNR(peak signal to noise ratio). An adaptive arithmetic coder for the multiresolution codebook generated by AFLC-VQ is currently under development. The addition of the entropy coder to the current compression scheme is expected to result in better performance of AFLC-VQ over JPEG for all compression ratios. FIGS. 5(a) and 5(b) show graphical representations of the performance for all the algorithms used. Actual examples of cervical spine image reconstructed by AFLC-VQ are visually superior over the ones by JPEG, and EZW with and without entropy coding at compression ratios around 100:1. The degradation in visual appearance of the images reconstructed by JPEG and EZW does not correlate with the statistical performance criteria such as MSE and PSNR as documented in other current literature. AFLC-VQ out-performs JPEG and EZW whose reconstructed images show deterioration dominated by the blocking artifact. FIG. 6 (a)–(l) shows the histograms of the above reconstructed images. It can be seen that compared with EZW and JPEG, AFLC-VQ reconstructed images preserve a much better shape of histogram of the image than those reconstructed from EZW and JPEG. Histograms of three color planes (R, G, B) are shown in FIGS. 7 (a)–(h). The high fidelity to the original image histogram by AFLC-VQ reconstruction in all color planes gives a sharp contrast to the much-deteriorated histograms from both EZW and JPEG reconstructions.

Application of fuzzy type clustering in nonconvex optimization problem in the framework of statistical mechanics has been addressed by maximizing the entropy at a given variance. The present invention provides for applying fuzzy clustering to codebook design leading to an efficient global optimum. The use or neuro-fuzzy algorithms for efficient vector quantization have led to high fidelity reconstruction of medical images even at very low bit rates.

Although the invention has been described with respect to various embodiments, it should be realized this invention is also capable of a wide variety of further and other embodiments within the spirit and scope of the appended claims.

What is claimed is:

1. A method for sending an image over a communications channel between and sender and a receiver comprising the steps of:

decomposing said image into sub-image data by multi-resolution wavelet decomposition/transformation,
    vector quantizing said sub-image data,
    vector quantization processing said vector quantized data with an adaptive fuzzy leader clustering algorithm,
    forming an indexed multi-resolution codebook and storing said codebook at both the sender and the receiver,
    sending said processed and quantized sub-image data as an index file of said multi-resolution codebook,
    receiving said index file and retrieving said processed and quantized sub-image data from said multi-resolution codebook at the receiver, and
    reconstructing said image data by inverse wavelet decomposition/transformation, and
    presenting said reconstructed image.

2. The method as defined in claim 1 further comprising the steps of:

forming the indexed multi-resolution codebook at the sender,
    sending said indexed codebook to said receiver, and
    storing said indexed codebook at said receiver.

3. The method as defined in claim 1 further comprising the steps of entropy encoding of the index file being sent and entropy decoding of the index file being received.

4. The method as defined in claim 1 wherein the step of vector quantizing comprises the steps of:

generating vectors from said wavelet transformed sub-image data,
    grouping similar vectors, and
    forming a centroid vector of said groupings of similar vectors.

5. The method as defined in claim 4 further comprising the steps of: selecting a vigilance parameter τ, said vigilance parameter τ determined by the ratio R, using R to group said vectors, where $N_1$ is the number of samples in class i, and $X_j$ is the current input vector, and $v_1$ is the winning centroid vector, and wherein $$R = \frac{\|X_j - v_i\|}{\frac{1}{N_i}\sum_{k=1}^{N_i}\|X_k - v_i\|} < \tau.$$

6. The method as defined in claim 1 wherein said step of decomposing by multiresolution wavelet transforms includes the step of decomposing said image into a plurality of levels, wherein each level has a different resolution of said image, and said step of reconstructing said image includes reconstruction of said plurality of levels.

7. The method as defined in claim 1 wherein the step of decomposing comprises the steps of: providing a filter function and choosing filtertaps.

8. The method as defined in claim 7 wherein said step of proving a filter functions comprises of the step of selecting an optimum filter length for the wavelet transformation for optimum representation of the image data.

9. A system for sending an image from a sender to a receiver over a communications channel comprising:

means for decomposing said image into sub-image data by multiresolution wavelet decomposition/transformation,
    a vector quantizer operating on said sub-image data,
    means for processing said vector quantized data with an adaptive fuzzy leader clustering algorithm,
    an indexed multi-resolution codebook stored at both the sender and the receiver,
    means for sending said processed and quantized sub-image data as an index file of said multi-resolution codebook,
    means for receiving said index file,
    means for retrieving said processed and quantized sub-image data from said multi-resolution codebook at the receiver, and
    means for reconstructing said image data by inverse wavelet decomposition/transformation, and
    means for presenting said reconstructed image.

10. The system as defined in claim 9 further comprising:

means for forming the indexed multi-resolution codebook at the sender,
    means for sending said indexed multi-resolution codebook to said receiver, and
    means for storing said indexed multi-resolution codebook at said receiver.

11. The system as defined in claim 9 further comprising means for entropy encoding of the index being sent and means for entropy decoding of the index being received.

12. The system as defined in claim 9 wherein said means for vector quantizing comprises:

means for generating vectors from said wavelet transformed sub-image data,
    means for grouping similar vectors, and
    means for forming a centroid vector of said groupings of similar vectors.

13. The system as defined in claim 12 further comprising: means for selecting a vigilance parameter τ, said vigilance parameter τ determined by the ratio R, means for using R to group said vectors, where N is the number of samples in class i, and X is the current input vector, and v is the winning centroid vector, wherein $$R = \frac{\|X_j - v_i\|}{\frac{1}{N_i}\sum_{k=1}^{N_i}\|X_k - v_i\|} < \tau.$$

14. The system as defined in claim 9 wherein said means for decomposing by multiresolution wavelet transforms includes means for decomposing said image into a plurality of levels, wherein each level has a different resolution, and said means for reconstructing said image includes means for reconstruction of said plurality of levels.

15. The system as defined in claim 9 further comprising means for filtering and means for choosing the filtertaps for optimal wavelet decomposition/transformation.

16. The system as defined in claim 15 wherein said means for choosing comprises means for selecting an optimal filter length for the wavelet transformation for optimal representation of the image data.

17. A method for sending an image over a communications channel between and sender and a receiver comprising the steps of:

decomposing said image into sub-image data by multi-resolution wavelet decomposition/transformation, vector quantizing said sub-image data, vector quantization processing said vector quantized data with an adaptive fuzzy leader clustering algorithm, sending said processed and quantized sub-image data, receiving said processed and quantized sub-image data at the receiver, and reconstructing said image data by inverse wavelet decomposition/transformation, and presenting said reconstructed image.

* * * * *